2 Sheets—Sheet 1.

E. J. BLOOD & A. D. HAGER.
CORN-HARVESTER.

No. 169,946. Patented Nov. 16, 1875.

WITNESSES:
A. Schattenberg.
S. H. Nathan.

INVENTOR:
Edwin J. Blood
Albert D. Hager

2 Sheets—Sheet 2.

E. J. BLOOD & A. D. HAGER.
CORN-HARVESTER.

No. 169,946. Patented Nov. 16, 1875.

WITNESSES:
A. Schattenberg,
S. W. Nathan

INVENTOR:
Edwin J. Blood
Albert D. Hager
By their Atty in fact
L. B. Smith

UNITED STATES PATENT OFFICE.

EDWIN J. BLOOD, OF VERNON, WISCONSIN, AND ALBERT D. HAGER, OF CHICAGO, ILLINOIS.

IMPROVEMENT IN CORN-HARVESTERS.

Specification forming part of Letters Patent No. 169,946, dated November 16, 1875; application filed July 15, 1875.

*To all whom it may concern:*

Be it known that we, EDWIN J. BLOOD, of Vernon, in the county of Waukesha and State of Wisconsin, and ALBERT D. HAGER, of Chicago, in the county of Cook, in the State of Illinois, have invented certain Improvements in Corn-Harvesters, of which the following is a specification:

The object of our invention is to harvest corn, and is a machine arranged so as to cut two rows of corn at once. The horse which draws the machine walks between the rows of corn, and the jaws of the machine gather in the corn, and two knives, made something like a saw, revolving against, or by, two stationary knives, cut the stalks of corn, and a couple of chains running on sprocket-wheels carry bands with teeth on them, which, running the length of the machine, carry the corn along, standing in a vertical position, to the rear of the machine, so that a man standing on the rear of the machine gathers the corn in a bundle between a frame, and binds the same as it stands on a platform made of slats, and when it is bound he stops the horse and pulls out a rest under the end of the slats, and they turn up edgewise, and the corn drops between them on the ground, then starts the horse, and the corn is slipped out and left standing on the ground.

Figure 1:
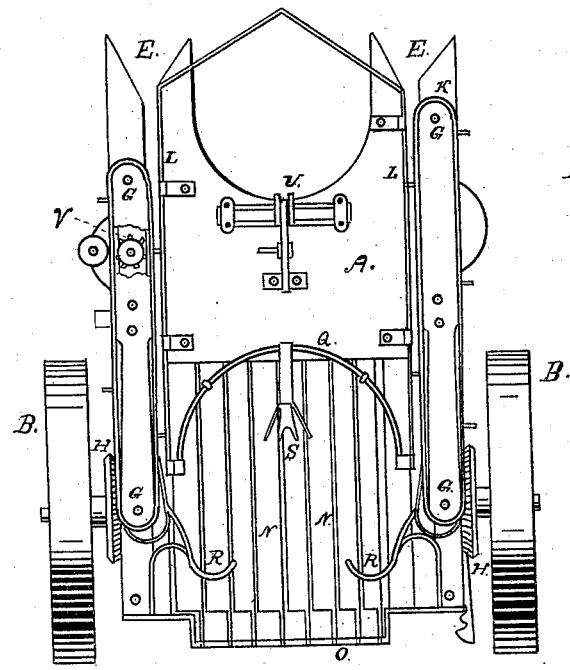
Figure 2:
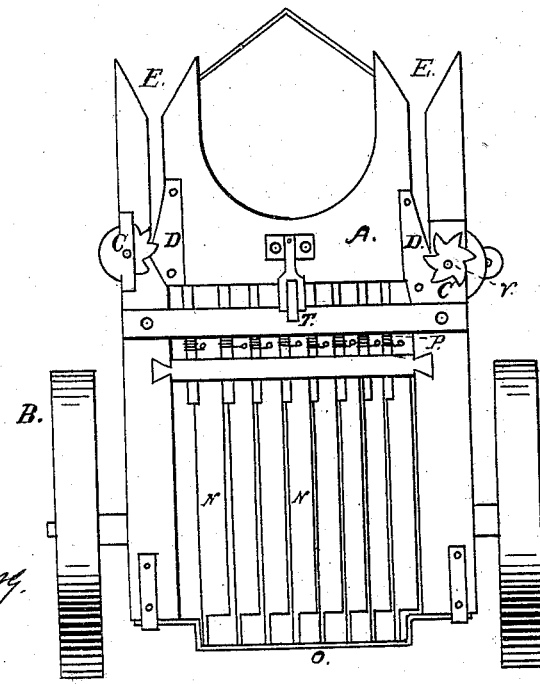
Figure 3:
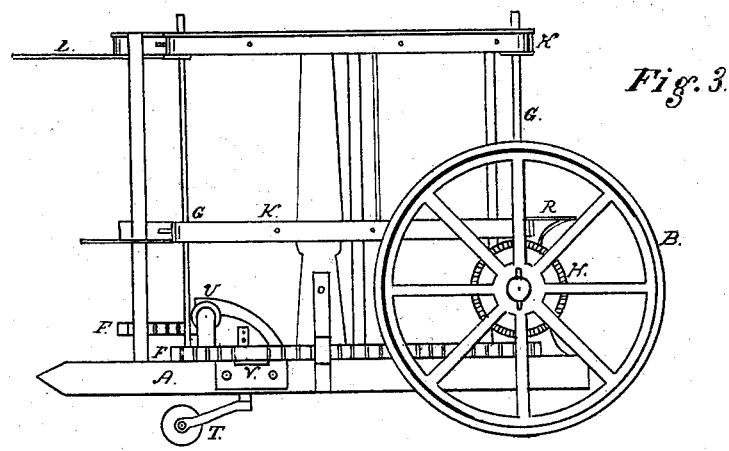
Figure 4:
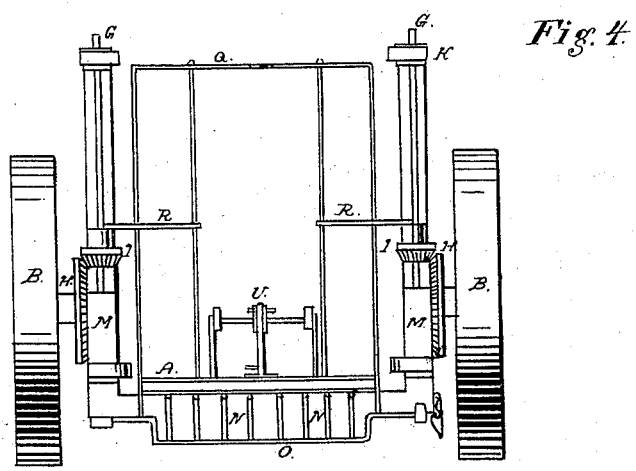

Figure 1 is a plan view of our invention; Fig. 2, a bottom view of same; Fig. 3, a side view; Fig. 4, an end view, showing the inside of same.

A is the frame of the machine; B B, the wheels on which it runs; C C, circular knives which cut the corn; D D, stationary knives, which the circular knives cut by, like a pair of shears; E E, jaws which gather the corn; F F, endless chains running on sprocket-wheels on the bottom of upright shafts G G G G, which are revolved by cog-wheels H H, meshing into pinions I I on shafts G, and endless bands K, with teeth on them; L L, slats, which the bands K press the corn against and carry it along; M M, brackets, which the axle-trees are secured to, so that the body of the machine hangs to and sets near the ground; N, slats, held up flatwise by rod O, so as to make a platform for the corn to stand on; P, a spring attached to the slats N. There is but one of these springs in the drawing, but it is intended to have one to every shank of the slats, so as to turn them up flatwise as soon as the corn is discharged. Q, frame into which the corn is carried to be bound; R R, conductors for the corn to strike against and be turned into the frame Q; S, a fork on the top of frame Q, onto which the first corn is placed to form the center of a bundle; T, truck under the forward part of the frame for it to run on; U, a wheel, to which the thills are attached, so that they may be raised or lowered, as may be found best; V, a sprocket-wheel on a shaft, which revolves the knives C, and is revolved by the chain F.

The following is the operation: A horse is attached to the machine to haul it along, and as the jaws come in contact with the corn the same is drawn in till it comes in contact with the knives, when the knives C, revolved by the chains F, cut off the stalks, and the bands carry them along to the rear end of the machine, and a man standing on the platform Q binds them into a bundle and then stops the horse, and steps off the platform onto the ground, and takes hold of rod O and pulls one end of it out of the hook in which it is caught, and bending it down, the ends of the slats, which are cut away so that a small pin of same is left on the side where the shaft at the other end is attached, turn down edgewise, and the corn passes between them and stands on the ground. The rod O is then pulled out and hangs by a swivel-hook at one end, and the horse is started up, and the slats are pulled out, leaving the corn standing on the ground. Then the man puts up the rod O again, steps on the platform, and secures another bundle, and so on.

We claim as our invention—

1. The revolving knife C, in combination with stationary knife D, sprocket-wheel V, and revolving chain F, substantially as set forth.

2. Fork S, with frame Q, and platform N, in combination, substantially as described.

3. Spring P, in combination with slats N, substantially as set forth.

EDWIN J. BLOOD.
ALBERT D. HAGER.

Witnesses to signature of E. J. BLOOD:
J. B. SMITH,
WILLIAM GAULT.

Witnesses to signature of A. D. HAGER:
YC. LINDSTROM,
J. DETWEILER.